(12) United States Patent
Mizukusa

(10) Patent No.: US 6,601,819 B2
(45) Date of Patent: Aug. 5, 2003

(54) DIE COOLING PART

(75) Inventor: Yasuyuki Mizukusa, Fukuyama (JP)

(73) Assignee: Ryobi Die Casting (USA), Inc., Shelbyville, IN (US)

( * ) Notice: Subject to any disclaimer, the term of this patent is extended or adjusted under 35 U.S.C. 154(b) by 130 days.

(21) Appl. No.: 09/934,204

(22) Filed: Aug. 21, 2001

(65) Prior Publication Data
US 2003/0039716 A1 Feb. 27, 2003

(51) Int. Cl.⁷ .......................... B29C 33/04; B29C 45/73
(52) U.S. Cl. ......................................... 249/79; 425/552
(58) Field of Search ............................. 249/79; 425/552

(56) References Cited

U.S. PATENT DOCUMENTS

| 705,772 | A | * | 7/1902 | Messer ........................ 425/526 |
|---|---|---|---|---|
| 2,557,507 | A | | 6/1951 | Lang, Jr. |
| 2,986,877 | A | | 6/1961 | Emmons et al. |
| 4,260,348 | A | | 4/1981 | Graham |
| 4,275,864 | A | | 6/1981 | Richards |
| 4,437,690 | A | | 3/1984 | Drath |
| 4,655,280 | A | | 4/1987 | Takahashi |
| 4,676,241 | A | | 6/1987 | Webb et al. |
| 4,791,961 | A | | 12/1988 | Nitzberg et al. |
| 5,275,444 | A | | 1/1994 | Wythoff |
| 5,553,893 | A | | 9/1996 | Foti |
| 5,814,357 | A | | 9/1998 | Boskovic |

* cited by examiner

Primary Examiner—James P. Mackey
Assistant Examiner—Donald Heckenberg
(74) Attorney, Agent, or Firm—Brooks & Kushman P.C.

(57) ABSTRACT

A cooling probe is provided for use with a mold section having an elongate blind passage extending therein. The cooling probe is made up of an axial spool having an outer peripheral surface and an internal inlet and outlet passage. The inlet tube connects to the spool and extends into the mold blind passage. An outlet and an inlet swivel fitting telescopically sealingly cooperate with the spool outer periphery and provide outlet and inlet fluid connectors which can be freely rotated relative to the spool to facilitate easy installation and removal of the cooling probe from the mold section.

12 Claims, 2 Drawing Sheets

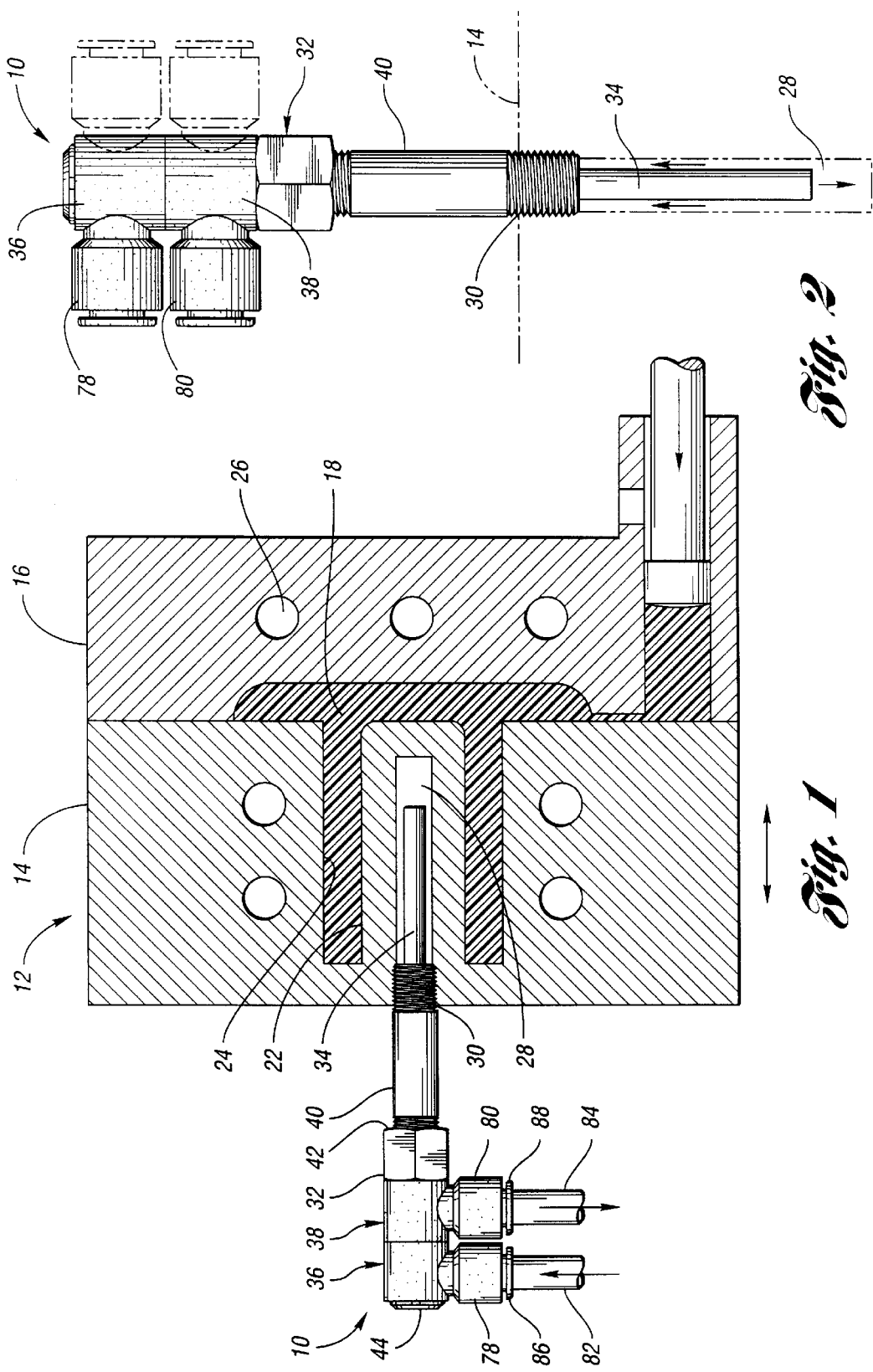

DIE COOLING PART

TECHNICAL FIELD

The present invention relates to cooling probes for molds used in die casting or injection molding.

BACKGROUND ART

While molding parts in metal die casting or plastic injection molding, mold sections, which define an internal cavity of the shape of the part to be formed are utilized. In order to control part quality and minimize cycle time, it is necessary to cool the mold sections. In instances when it is desired to make a part with a deep recess, one of the mold sections is integrally formed with an elongate projection sized to form interior surface of the recess. It is frequently difficult to cool the elongate projection portion of the mold section with a typical machined closed loop cooling passage. As a result, extended projections in mold sections have been provided with an internal elongate blind passage extending from an external opening into the region of the mold sought to be cold. A cooling probe is attached to the mold section at the external opening of the said passage in order to inject cooling fluid deep into the blind passage in order to extract heat from projection in the mold section. The cooling probe is accordingly provided with a fluid inlet and a fluid outlet with the fluid inlet typically being associated with a long inlet tube extending into the blind passage.

Prior art cooling probes have been difficult to install, particularly in tight places and it is frequently necessary to disassemble the probe and partially break the inlet and outlet cooling fluid connections in order to remove the cooling probe from the mold section.

DISCLOSURE OF INVENTION

Accordingly, the cooling probe of the present invention is designed for installation upon a mold section having a elongate blind passage so that a cooling probe can be installed and removed without disconnecting the inlet and outlet fluid lines. The cooling probe is made up of an axial spool having a fixed end adapted to be sealingly connected to the mold section external opening having a free end spaced axially therefrom with the central region therebetween having an outer peripheral surface. The outer peripheral surface includes an inlet region and an outlet region. A spool central region is further provided with an internal cavity forming a fluid inlet passage and fluid outlet passage. An inlet port and an outlet port respectively extend between the inlet and outlet regions having an inlet and outlet port passageways. An inlet tube is axially aligned with the spool and is affixed to and in fluid communication with the fluid inlet passageway with the inlet tube free end sized for insertion into the elongate tubular passage in the mold section to be cooled. The cooling probe is further provided with an outlet spiral fitting and an inlet swivel fitting, each having a tubular section sealingly, pivotally and coaxially cooperating with the outer peripheral surface of the spool. The outlet and inlet swivel fittings are respectively provided with outlet connector and an inlet connector in fluid communication with the outlet port and the inlet port. The swivel fittings are free to rotate relative to the spool to facilitate easy insertion of the cooling probe into a mold section and further enabling the cooling probe to removed or installed without disconnecting the inlet and outlet cooling lines and the outlet and inlet swivel fitting connectors.

The preferred cooling probe is further provided with a series of elastomeric annular seals mounted upon the swivel outer peripheral surface sealingly cooperating with the outlet and inlet swivel fittings and axially spaced about the outlet port and inlet ports.

The preferred cooling probe is further provided with an annular fastener which axially retains the inlet and outlet swivel fittings on the spool once telescopically installed thereon prohibiting axial removal while enabling free relative rotation of the swivel fittings and the spool.

BRIEF DESCRIPTION OF DRAWINGS

FIG. 1 is a cross-sectional side elevational view of the cooling probe of the present invention installed on a mold assembly;

FIG. 2 is a cross-sectional side elevational view of the present invention;

BEST MODE FOR CARRYING OUT THE INVENTION

Figures 3, 4:
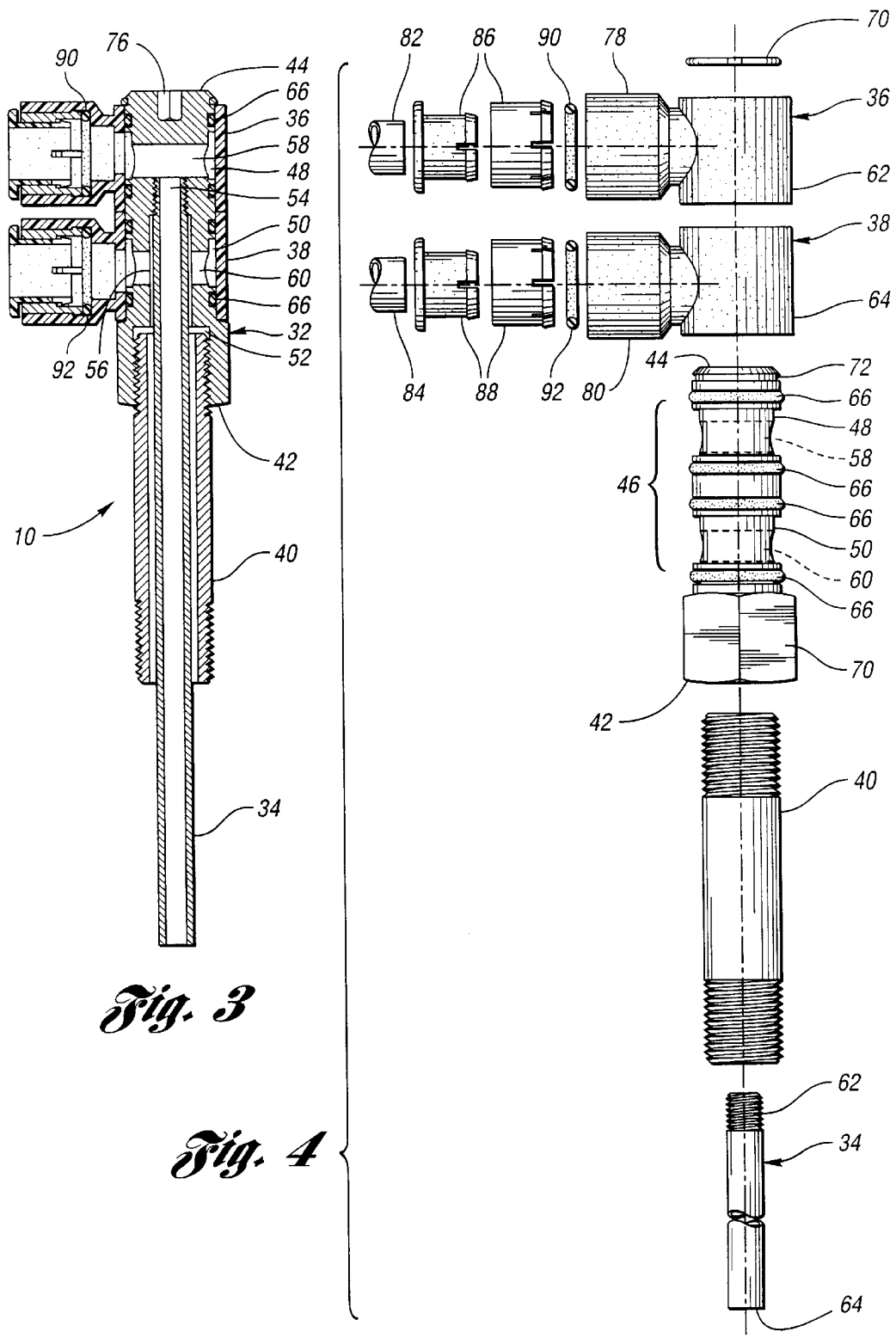
FIG. 3 is a cut-away cross-sectional side view of the present invention.
FIG. 4 is an exploded view of the present invention.

Cooling probe 10 of the present invention is illustrated in FIGS. 1–4, Cooling probe 10 is illustrated in FIG. 1 is installed on a generic two piece mold assembly 12 made up of a first section 14 and a second section 16 which defines a cavity 18 therebetween. Molten material is injected into cavity 18, by piston 20 or another suitable molten material inlet. In the representative mold assembly 12, the illustrated first section 14 is provided with a projection 22 and mold second section 16 is provided with a corresponding concave recess surface 24 in order to define a generally cup-shaped part in the shape of cavity 18 therebetween. In order to cool mold assembly 12, mold second section 16 is provided with a series of internal cooling passageways 26 which are conventionally machined in the second section 16. Due to the shape of projection 22, a closed loop passage cannot be easily machined into first section 14. Accordingly, an elongate passage 28 is machined into first section 14 extending axially from external opening 30 on the mold first section 14 surface. Cooling probe 10 is installed on the mold first section 14 in fluid communication with external opening 30 in general, coaxial alignment with elongate blind passage 28 as illustrated in FIG. 1.

Cooling probe 10 is made up of four main components: a spool 32, an inlet tube 34, an inlet swivel fitting 36 and an outlet swivel fitting 38. In the preferred embodiment illustrated, a tubular threaded coupling 40 is coaxially installed about the upper portion of inlet tube 38 and is interposed between spool 32 and mold first section 14. Alternatively, spool 32 can thread directly into mold first section 14.

Spool 32 is provided with a fixed end 42 adapted to be sealing coupled to the mold external opening 30. In the embodiment illustrated, fixed end 42 is provided with an internal tapered pipe thread section adapted to cooperate with corresponding male pipe thread section on the upper end of coupling 40 as illustrated. The opposite end of coupling 40 is similarly provided with an external male pipe thread for sealingly engaging an internally threaded region an mold first section external opening 30. Spool 32 is further provided with a fixed end 42 and an spaced open free end 44. Between free end 44 and fixed end 42 is a central portion 46 provided with an outer peripheral surface which defines an axially spaced apart inlet region 48 and an outlet region 50. Spool central portion 46 is further provided with an internal cavity 52 which forms at least in part a fluid inlet passage 54 and a fluid outlet passage 56. Fluid central portion 46 is further provided with an inlet port 58 and an outlet port 60 which respectively extend between inlet and outlet regions 48 and 50 and fluid inlet and outlet passageways 54 and 56.

Inlet tube 34 is axially aligned with spool 32. Inlet tube 34 is provided with a fixed end 62 which is preferably provided with a tapered external threaded section which threadingly engages in fluid communication with inlet passage 54 in spool 32. The free end 64 of inlet tube 34 cantileverly extends into an elongate blind passage 28 in the mold section to be cooled. Cooling fluid enters the blind passage 28 through the central bore in inlet tube 34 and exits the blind passage through the annular section defined by the internal surface of elongate blind cavity and the outer peripheral surface of inlet tube 34.

Outlet swivel fitting 38 and inlet swivel fitting 36 preferably telescopically fit over free end 44 of spool 32. Inlet and outlet swivel fittings 36 and 38 are each provided with a tubular section 62 and 64 which sealingly, pivotally, coaxially cooperates with the inlet region 48 and outlet region 50 of outer peripheral surface of central portion 46. Tubular section 62 of inlet swivel fitting 36 and tubular section 64 of outlet swivel fitting 38 are each provided with a cylindrical bore illustrated. The outer peripheral surface of spool 32 is sized to sealingly fit within the internal bore of tubular sections 62 and 64. Ideally, inlet swivel fitting and outlet swivel fitting will be identical, however, it is alternatively possible to make a tubular section 64 and a corresponding diameter outlet region 50 larger in diameter than inlet swivel fitting 36, tubular section 32 and corresponding inlet region 48. Having graduated diameters make assembly easier, however, this benefit does not believe to be warranted in light of the expense of tooling for two different inlet and outlet swivel fittings.

On the peripheral surfaces of the inlet region 48 and outlet region 50 are provided with annular seals spaced apart on axial sides of inlet port 58 and outlet port 60 in order to form a fluid tight seal between the outer peripheral surface spool 32 and the inner surface of inner tubular section 62 and 64. In the preferred embodiment, the annular seal is provided by four elastomeric rings 66 mounted in a series of four annular grooves 68 and the outer periphery of spool 32. Once an inlet and outlet swivel fittings 36 and 38 are telescopically installed on the spool 32, with the elastomeric ring 66 in place, a fluid tight seal is formed due to the radial compression of the elastomeric rings between the tubular section 62 and 64 of the swivel and the corresponding annular grooves 68 in spool 32.

Once inlet swivel fitting 36 and outlet swivel fitting 38 are telescopically installed on spool 32, an annular fastener such snap ring 70 is affixed to the free end 44 of spool 36 to prevent axial movement of the inlet and outlet swivel fittings. Snap ring 70 fits in a corresponding groove 72 machined in the spool immediately adjacent free end 44 thereby limiting axial movement, but permitting free relative rotation of the inlet and outlet swivel fittings 36 and 38 relative to spool 32. In order to facilitate installation of cooling probe 10 into mold first section 14, spool 32 must be provided with an engagement surface adapted to cooperate with a wrench so that the spool may be rotated about its axis. In the embodiment illustrated, fixed end 42 spool is provided with hexagonal surface having three pairs of spaced apart parallel flats 74 to enable the spool to be turned with an open end wrench. The free end 44 of spool 32 is additionally provided with a recessed hexagonal socket 76 adapted to cooperate with a conventional Alan® wrench.

Since inlet and outlet swivel fittings 36 and 38 are free to rotate relative to spool 32, cooling probe 10 may be installed in tight areas where inlet and outlet connectors 78 and 80 might inhibit rotation of spool 32. Inlet and outlet connectors 78 and 80 may be installed on cooling fluid lines 82 and 84 during the installation or removal of the cooling probe from the mold first section 14. Inlet and outlet connectors 78 and 80 may be any one of a number of designs from a simple straight tube section which a rubber hose may be attached using a hose clamp or the tooless plastic tube connector illustrated sized to receive a conventional Tygon® plastic tube may be inserted and securely retained and sealed in place by plastic barrels 86 and 88 and elastomeric seals 90 and 94 as illustrated.

Preferably spool 32 is made of corrosion resistant metal such brass or the like which can be simply machined on an automatic screw machine. Inlet and outlet swivels 36 and 38 are ideally suited to be formed of injection molded plastic, however, they likewise could be fabricated from metallic tubes cut and welded together. The cooling probe of the present invention is relatively simple to fabricate and provides a significant improvement in ease of installation of removal, particularly in tight places.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A cooling probe for use with a mold section provided with an elongate blind passage extending axially from an external opening into a region of the mold to be cooled, the cooling probe comprising:

an axially elongated spool having a fixed end adapted to be sealingly coupled to the mold section external opening, an axially spaced apart free end, and a central portion therebetween provided with an outer peripheral surface defining an axially spaced apart inlet region and outlet region, this spool central region further having an internal cavity which forms at least in part a fluid inlet passageway and a fluid outlet passageway, the spool central passageway having an inlet port extending between the outer peripheral surface and an internal cavity fluid inlet passageway and an outlet port extending between the outer peripheral surface outlet region and the internal cavity fluid outlet passageway;

an inlet tube axially aligned with the spool, having a fixed end extending into the spool internal cavity and affixed to the spool in fluid communication with the fluid inlet passageway, and a free end for insertion into the elongate blind passageway in the mold section to be cooled;

an inlet swivel fitting having a tubular section sealingly, pivotally, coaxially cooperating with the outer peripheral surface inlet region and having an inlet connector in fluid communication with the inlet port;

an outlet swivel fitting having a tubular section sealingly, pivotally coaxially cooperating with the outer peripheral surface outlet region and having an outlet connector in fluid communication with the outlet port;

wherein the inlet and outlet swivel fittings may be rotated relative to the spool while maintaining fluid communication between the inlet connector and the fluid inlet passageway and the outlet connector and the fluid outlet passageway.

2. The cooling probe of claim 1 wherein the spool outer peripheral surface is further provided with a plurality of annular seals for sealingly cooperating with the outlet swivel fitting and the inlet swivel fitting.

3. The cooling probe of claim 2 wherein at least three annular seals are provided on the spool outer peripheral surface, two of which cooperate with the outlet swivel fitting and are axially spaced about the outlet port, and two of which cooperate with the inlet swivel fitting and are axially spaced about the inlet port.

4. The cooling probe of claim 3 wherein the annular seals further comprise four annular seals formed of an elastomeric member.

5. The cooling probe of claim 1 wherein the outlet swivel fitting and the inlet swivel fitting are telescopically installed upon the spool and are retained in place by at least one annular fastener which prevents the axial removal of the adjacent swivel fitting.

6. The cooling probe of claim 1 wherein the spool fixed end is provided with a threaded portion to facilitate threadingly connecting the spool to the mold section external opening.

7. The cooling probe of claim 6 wherein the spool fixed end is provided with a threaded section and the cooling probe further comprises a tubular threaded coupling interposed between and sealingly connected to the spool fixed end threaded portion and the mold section external opening.

8. The cooling probe of claim 1 wherein the outlet swivel fitting and the inlet swivel fitting telescopically fit over the spool free end and are axially retained in place by a annular fastener which prevents axial movement and facilitates free rotation of the outlet swivel fitting and the inlet swivel fitting relative to the spool.

9. The cooling probe of claim 8 wherein the free end of the spool is provided with a drive portion adapted to enable the spool to be rotated by a tool during installation and removal.

10. The cooling probe of claim 1 wherein the fixed end of the spool is provided with a fastener portion adapted to facilitate the rotation of the spool during installation and removal of the die cooling probe and the mold section.

11. The cooling probe of claim 10 wherein the spool fixed end fastener region comprises at least two parallel spaced apart wrench flats integrally formed on the spool.

12. The cooling probe of claim 1 wherein the outlet swivel fitting and inlet swivel fitting fluid connectors each further comprise a tooless quick-connect fitting adapted to respectively sealingly cooperate with a fluid inlet or outlet tube, respectively.

\* \* \* \* \*